W. C. BARNES & C. A. OPPERMAN.
WIRE STRETCHER.
APPLICATION FILED MAY 7, 1914.
1,119,671.
Patented Dec. 1, 1914.
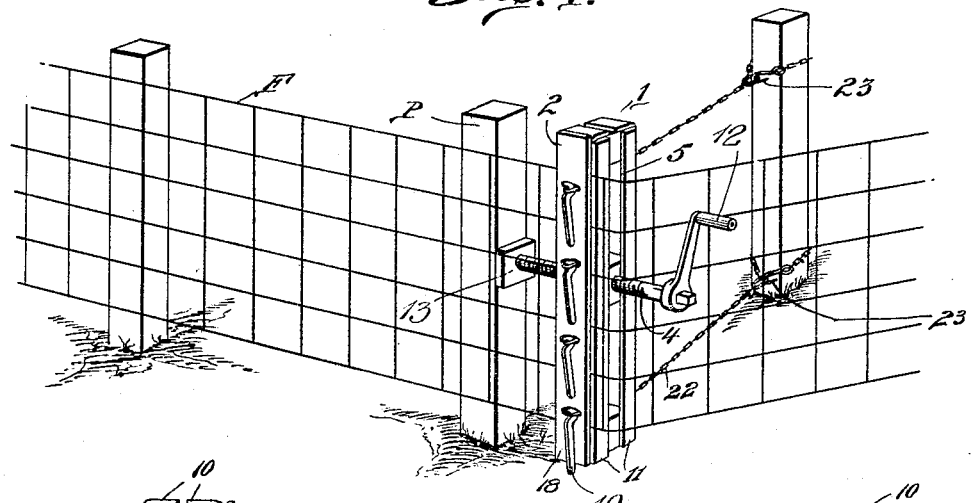
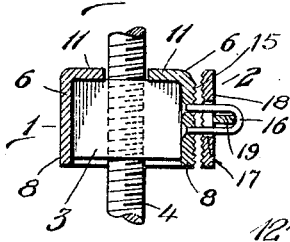
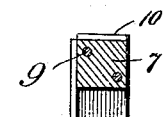
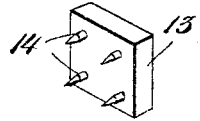
Inventors
W. C. Barnes.
AND
C. A. Opperman.
Witnesses
By
Attorneys

UNITED STATES PATENT OFFICE.

WILLIAM C. BARNES AND CONRAD A. OPPERMAN, OF EVANSVILLE, INDIANA.

WIRE-STRETCHER.

1,119,671.  Specification of Letters Patent.  Patented Dec. 1, 1914.

Application filed May 7, 1914. Serial No. 837,001.

*To all whom it may concern:*

Be it known that we, WILLIAM C. BARNES and CONRAD A. OPPERMAN, citizens of the United States, residing at Evansville, in the county of Vanderburg and State of Indiana, have invented certain new and useful Improvements in Wire-Stretchers; and we do declare the following to be a full, clear, and exact description of the invention, such as will enable others skilled in the art to which it appertains to make and use the same.

Our invention relates to improvements in wire stretchers and more particularly to those which are designed for stretching woven wire fences, although its application need not be limited in this respect.

The primary object of the invention is to provide a device of this character which may be simply and inexpensively constructed and which will be highly efficient in operation.

In carrying out the above end, we provide an upright channel shaped member having in its transverse wall, an upright slot, means carried by said member for attachment to the wire, a rectangular nut in said member, and a crank operated screw passing through said nut, and said slot and adapted to bear against the fence post.

A secondary object of the invention is to form the various parts in such a manner as to allow the screw to be adjusted vertically and to prevent said nut from rotating.

Still another object of the invention is to provide simple and efficient means for clamping the wire to be stretched.

With these objects in view, the invention resides in certain novel features of construction and combination herein described and claimed and shown in the drawings wherein:—

Figure 1 is a perspective view of a portion of a fence showing the application of our invention; Fig. 2 is an end view; Fig. 3 is a vertical section showing more particularly the location of the nut and screw; Fig. 4 is a horizontal section taken on the line 4—4 of Fig. 2; and Fig. 5 is a perspective view of the pronged head.

In the accompanying drawings we have shown our invention as comprising an upright channel shaped member 1, a clamp 2 for clamping the wire to said member, a nut 3 within said member and a crank driven screw 4 which is threaded through said nut and operates loosely through an upright slot 5 formed in the member 1.

As clearly shown in the various figures of the drawings, the upright member 1 comprises a pair of angle iron bars 6 which are spaced throughout their lengths by upper and lower spacing blocks 7 to which their parallel flanges 8 are secured by means of bolts 9 or other suitable fastening means. The upper and lower ends of said parallel flanges 8 are turned inwardly as indicated at 10 and forced into contact with the outer ends of said spacing blocks, this formation assisting in imparting rigidity to the device.

As most clearly shown in Figs. 2 and 4, the slot 5 is formed by constructing the inwardly extending flanges 11 of the bars 6, of less width than the width of the spacing blocks, the space between said flanges 11 constituting the slot.

Mounted adjustably within the member 1 and contacting with all of the flanges of said member is the rectangular nut 3 which is thus held against rotation and is allowed to freely slide vertically for a purpose to appear. As before suggested, it is through the nut 3 and the slot 5 that the screw 4 extends, said screw being provided on one end with an operating crank 12 while its opposite end carries a swiveled head 13 which is provided with a number of prongs 14, the latter being adapted to engage one of the posts P when a fence F is being stretched.

The above mentioned clamp 2 includes one of the angle iron bars 6 which is corrugated as indicated at 15 for the purpose of more securely clamping the wire and is provided with a number of U-bolts or loops 16 which are are disposed at suitable intervals throughout its length, said loops 16 passing through transverse slots 17 in a movable corrugated clamping plate 18 and being designed to receive clamp operating members in the form of levers 19 having their upper ends formed into hooks 20, said hooks increasing in width from their bills 21 to the points at which they join the levers 19. It will thus be seen that a cam action is exerted upon the clamping plate 18 when the levers are forced downwardly, thus securely clamping the wire of the fence between the fixed and movable members of the clamp.

It will be further seen that by merely removing the hooks from the loops, the entire movable clamp plate may be removed.

The operation of the device is as follows: The upright member 1 is clamped upon the fence F by the means previously described and the screw and nut are positioned as illustrated in the drawings, the head 14 of said screw now contacting with one of the posts P. It will thus be seen that rotation of the screw 4, in the proper direction, will cause the member 1 to recede from the post, thereby effectually stretching the wire. In most cases, in order to prevent the stretcher from shifting laterally, it becomes necessary to provide a pair of stay chains 22 which may be secured to other posts or suitable supports by means of hooks 23. By mounting the screw and nut in the above described manner, it will be seen that vertical adjustment of these parts is allowed, this feature becoming advantageous in case it becomes necessary to stretch one edge of the fence a greater amount than the other edge thereof.

From the foregoing description, taken in connection with the accompanying drawings, it will be seen that we have produced a comparatively simple device for carrying out the objects of the invention, yet one which will be efficient in operation and which may be inexpensively manufactured.

Having thus described our invention, what we claim as new and desire to secure by Letters Patent is:—

1. A wire stretcher including an upright channel shaped member composed of a pair of spaced upright angle iron bars, spacing blocks between the ends thereof and spacing their inwardly extending flanges to provide an upright slot, the ends of the parallel flanges of said bars being bent inwardly into engagement with the outer ends of said spacing blocks. a rectangular nut between said angle iron bars and contacting with both flanges thereof, a screw passing through said slot and the nut and a handle for rotating the screw.

2. A wire stretcher comprising an upright channel-shaped member having parallel side flanges and longitudinal flanges extending inwardly therefrom, said inwardly extending flanges having their facing edges spaced substantially throughout their lengths whereby to provide an upright slot, a rectangular nut within said channel-shaped member and having flat faces contacting with all of the flanges thereof, a horizontal screw passing through the upright slot and through the nut, means whereby said screw may be rotated, and means whereby said channel-shaped member may be attached to the wire to be stretched.

In testimony whereof we have hereunto set our hands in presence of two subscribing witnesses.

WILLIAM C. BARNES.
CONRAD A. OPPERMAN.

Witnesses:
WILLIAM A. WALLER,
Z. L. WOLFE.

Copies of this patent may be obtained for five cents each, by addressing the "Commissioner of Patents, Washington, D. C."